United States Patent [19]
Bailey

[11] Patent Number: 5,934,480
[45] Date of Patent: *Aug. 10, 1999

[54] DROP SLING LUMBER SORTER APPARATUS

[75] Inventor: Warner Bailey, P.O. Box 769, Wells, Tex. 75976

[73] Assignee: Warner Bailey, Wells, Tex.

[*] Notice: This patent is subject to a terminal disclaimer.

[21] Appl. No.: 08/862,330

[22] Filed: May 23, 1997

Related U.S. Application Data

[63] Continuation of application No. 08/528,691, Sep. 15, 1995, Pat. No. 5,632,383, which is a continuation of application No. 08/205,888, Mar. 3, 1994, Pat. No. 5,476,355.

[51] Int. Cl.$^6$ .................................................. B65G 47/34
[52] U.S. Cl. .............................................................. 209/517
[58] Field of Search .................................... 209/517, 518, 209/519, 520, 521; 403/355, 356

[56] References Cited

U.S. PATENT DOCUMENTS

| | | | |
|---|---|---|---|
| 525,009 | 8/1894 | Fiester | 403/356 |
| 786,039 | 3/1905 | Langlands | 403/355 |
| 923,678 | 6/1909 | Masters | 403/355 |
| 2,950,933 | 8/1960 | Mayne et al. | 403/356 |
| 3,153,828 | 10/1964 | Glover | 24/123 |
| 3,352,590 | 11/1967 | Barthule | 294/74 |
| 3,578,182 | 5/1971 | Harvey | 214/6 |
| 3,583,750 | 6/1971 | Norton | 294/74 |
| 3,625,559 | 12/1971 | Lawrence | 294/74 |
| 3,776,379 | 12/1973 | Harvey | 209/73 |
| 3,915,487 | 10/1975 | Zeiler | 294/78 R |
| 4,098,407 | 7/1978 | Moore | 209/517 |
| 4,104,156 | 8/1978 | Fletcher | 209/521 |
| 4,205,751 | 6/1980 | Rysti | 209/517 |
| 4,290,722 | 9/1981 | Rysti et al. | 209/517 |
| 4,429,526 | 2/1984 | Rehbein | 59/93 |
| 4,742,920 | 5/1988 | Doherty | 209/517 |
| 5,123,690 | 6/1992 | Bailey | 294/74 |

FOREIGN PATENT DOCUMENTS

| | | | |
|---|---|---|---|
| 2 415 598 | 9/1979 | France | 294/74 |
| 25 29 467 | 1/1977 | Germany | 294/74 |
| 335923 | 9/1930 | United Kingdom | 294/82.1 |
| 1075518 | 7/1967 | United Kingdom | 294/74 |

OTHER PUBLICATIONS

Harvey Engineering and Manufacturing Corp., Brochure entitled "HEMCO A World Leader in Lumber Handling & Dry Kiln Systems," 6 pages (undated).

Irvington Moore, "Quick–Release Sling Sorter," Data Sheet Lumber Handling Systems, 2 pages (undated).

Irvington–Moore/Buss Automation, "How the Irvington–Moore Sling Sorter Saves Lumbermen Money with Superior Engineering," 2 pages (undated).

*Primary Examiner*—Thomas J. Brahan
*Attorney, Agent, or Firm*—Akin, Gump, Strauss, Hauer & Feld, L.L.P.

[57] ABSTRACT

A drop sling lumber sorter apparatus comprising a frame assembly including a plurality of bays for receiving pieces of sorted lumber. Each of the bays includes a rotatable drive shaft mounted to the frame assembly and a plurality of elongated, flexible, laterally spaced slings having a first end and a second end. The first end of each sling is mounted to the drive shaft. A pivoting hook and retriever assembly selectively capture and release the second end of each sling to the frame assembly. A spool assembly is mounted on the drive shaft for each sling. Each spool assembly is capable of guiding the sling onto the rotatable drive shaft. The slings are reeled onto or reeled off of the drive shaft as the drive shaft rotates. A tensioner assembly tensions the slings as they are reeled off of the drive shaft.

11 Claims, 4 Drawing Sheets

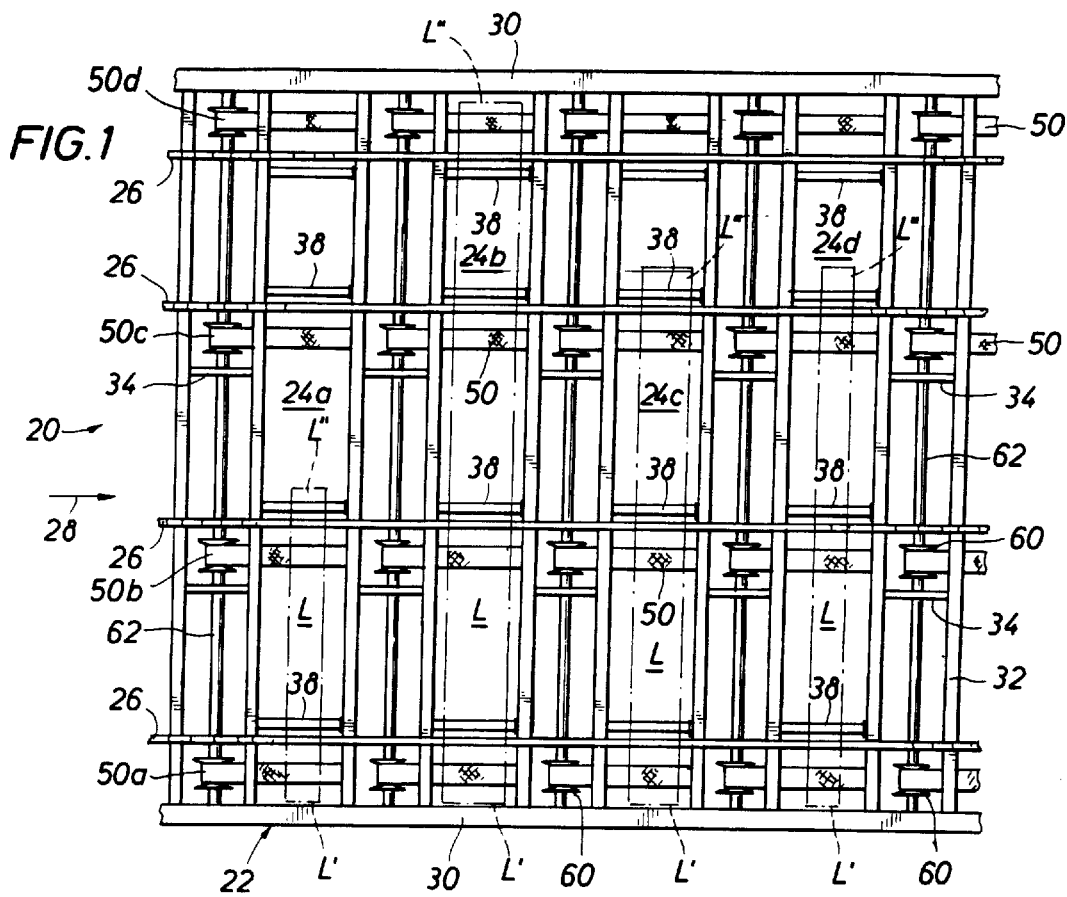
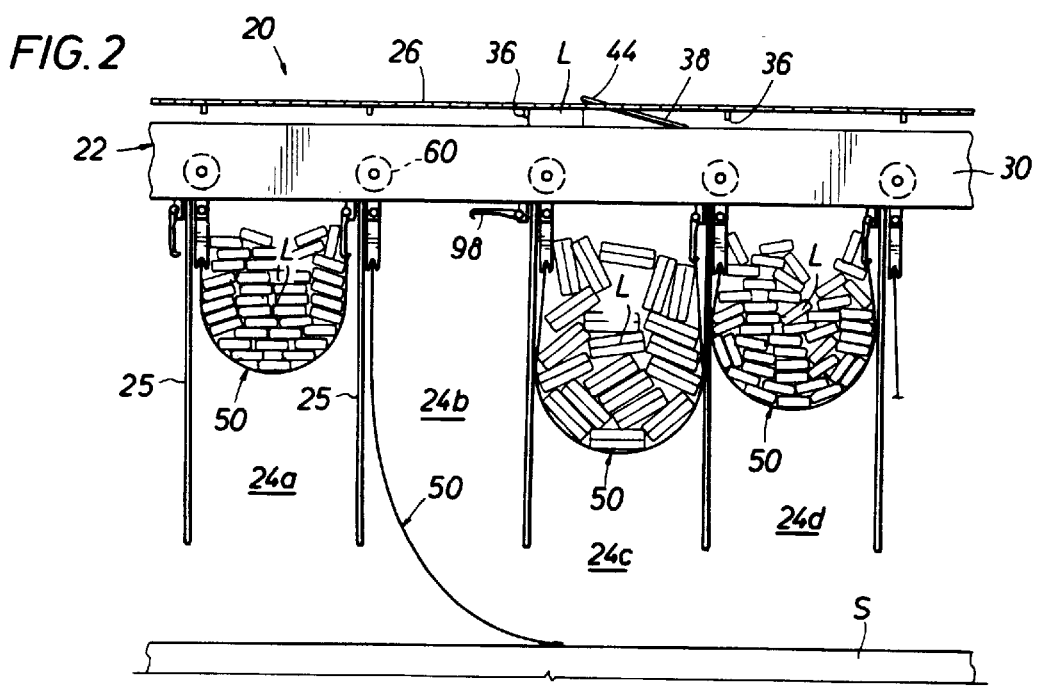

DROP SLING LUMBER SORTER APPARATUS

This is a continuation of application Ser. No. 08/528,691 filed on Sep. 15, 1995 (which will issue May 27, 1997 as U.S. Pat. No. 5,632,383) which is a continuation of application Ser. No. 08/205,888 filed on Mar. 3, 1994 (now U.S. Pat. No. 5,476,355).

BACKGROUND OF THE INVENTION

1. Field of the Invention

The present invention relates to the field of lumber sorters, and more particularly to such sorters having flexible slings with releasable ends to form cradles for receiving the sorted lumber.

2. Description of the Prior Art

Like many businesses, the lumber industry has become highly mechanized. Machines convert forest timber to building lumber with minimal human assistance. The machines receive raw logs which are processed and cut to produce building lumber and a variety of other useful products. When this final process is complete, the lumber must be sorted and packaged for delivery to users.

The modern sling sorter system for sorting lumber, such as the Harvey Engineering and Manufacturing (HEMCO) inline planermill and green lumber sorting system, is common in the lumber industry and performs the lumber sorting operation rapidly. A conveyor receives each board of lumber of assorted lengths. As the board is cut and trimmed to the particular specifications, a computer records the board's position on the conveyor.

The conveyor then moves the cut lumber along a plurality of parallel rails. The rails are divided into segments so that a set of segments may temporarily swing upward, creating an opening in the parallel rails. The segments are controlled by the computer. When a board of particular specifications reaches a point directly above a certain location on the rails, the rail segments are controlled by the computer. When a board of particular specifications reaches a point directly above a certain location on the rails, the rail segments automatically swing upward, and the board drops through the opening. The lumber is sorted by dropping all lumber of the same specification through the same opening, or additional bays, if required.

Beneath each opening are, typically, from three to five flexible slings. The slings hang parallel to the rails across the opening, and are usually made of tough webbing. As the boards fall through the opening, they are received by lumber receiving cradles defined by the plurality of laterally spaced flexible slings.

One end of each sling is securely attached to a sling spool or reel mounted on a power-operated drive shaft. The other end of each sling features a D-ring permanently attached by inserting the sling webbing through the D-ring and sewing the sling webbing to itself. The D-ring, as the name indicates, is typically shaped like the letter "D" or is approximately triangular in shape. The end of the sling webbing loops over the base of the triangle and is securely sewn to itself. One such D-ring is disclosed in Applicant's U.S. Pat. No. 5,123,690. Applicant hereby incorporates by reference U.S. Pat. No. 5,123,690 in its entirety.

The D-ring releasably attaches to a pivoting hook which is permanently connected to the sorter frame. Each sling spool contains several wraps of a flexible sling of suitable length. The power-operated drive shaft allows the plurality of slings in each bay to pay out or take up the slings as required. As the sling cradle fills with lumber, the sling spool is unwound so as to deliver more sling so that the sling cradle remains essentially full without overloading. This feature minimizes damage to the boards by reducing the falling distance of the newly sorted lumber onto the lumber already being supported in the sling cradle.

The lumber collected in the sling cradle is ultimately unloaded onto an underlying conveyor. The unloading is performed by paying out the slings until the lumber is resting on the underlying conveyor. With the slings relaxed, the hook is withdrawn from the D-ring, thus permitting the D-ring and free end of each sling to fall to the floor surface. After the free ends of the slings have been released, the power-operated drive shaft takes up the slings onto the sling spools. The sling webbing passes through a retriever assembly attached to the sorter frame and positioned below the sling spool. The sling spool retrieves the sling through the retriever assembly until the D-ring is firmly received in a slot at the end of the retriever assembly. Continued rotation of the sling spool causes the retriever assembly with the received D-ring to pivot upwards approximately 90° so that it extends substantially horizontally across the bay opening.

The lumber sorter includes a mechanism for recapturing the D-ring and free end of the slings in the retriever assembly to reform the lumber cradle. The hook is pivotably connected to the sorter frame and made to extend towards the horizontally positioned retriever assembly. As the retriever assembly pivots to the horizontal position the hook catches the D-ring at the end of the retriever assembly. The hook is remotely controlled, typically by hydraulics and/or air. By engaging the D-ring with the hook, the bay is now ready to receive the next load of lumber. The first sorted boards fall gently onto the retriever assembly and/or hook. As the sorted lumber falls into the bay, the hook is rotated in a slight downwardly direction and the power-operated drive shaft rotates the sling spool to pay out a sufficient length of sling to permit the retriever assembly to rotate to a substantially vertical hanging position as the sling cradles fill with the sorted lumber.

Sling-type lumber sorters of the above-described general type are disclosed in U.S. Pat. Nos. 3,776,379, 4,098,407, and 4,104,156.

One problem with the above-described sling-type lumber sorters results from the fact that the plurality of slings in each bay are uniformly spaced from one another and the lumber being sorted in the bay may not have a length sufficient to be supported by one or more of the "uneven end" slings. As the lumber is initially transported along the set of parallel rails, all of the boards of various lengths have an aligned end which is referred to as the "even end." The other end of the boards is referred to as the "uneven end." Typically, each bay has 4–6 slings spaced approximately 3–4' from one another which thus can handle boards having a length of up to 24' or greater. However, this same bay may be required to receive boards having a length of only 10' in which case only the 2 or 3 slings nearest the even end (even end slings) receive the lumber. The problem arises with the flexible slings which are not presently receiving the lumber (uneven end slings) in the bay and which are expected to cleanly pay out from the sling spool as the power-operated drive shaft rotates all of the sling spools in that bay. The absence of weight on these non-loaded uneven end slings results in many problems, such as these slings becoming twisted, becoming slack on the sling spool, slipping off of the sling spool and wrapping around the drive shaft, or becoming slack on the sling spool and then doubling up on itself. Oftentimes, the uneven end slings have a life expectancy of only ⅓ that of even end slings. Occasionally, the uneven end slings may last only 15% of the life of the even end slings. Thus, maintenance of uneven end slings is a constant problem requiring inspection. The operator's safety is jeopardized by poorly maintained and inspected slings. The premature wear of the slings reduces the useful life of the sling. To prevent a failure, the sling must be periodically replaced. Replacement of a damaged sling involves shutting down the entire sorter apparatus. The owner pays for the materials and labor for the replacement, and also experiences a reduced sorter system efficiency due to the temporary shut down of the entire sorter apparatus. Most importantly, failure to routinely maintain and inspect the slings subjects human lives to increased risks.

The problem mentioned above may also result in irreparably damaging the sling spool on the drive shaft. Presently, replacement of the sling spool requires removal of the drive shaft and the associated drive mechanism. Typically, this requires the lumber sorter apparatus to be shut down for several hours. Thus, oftentimes a badly damaged sling spool will not be replaced until absolutely necessary even though additional damage may be resulting to the sling. Additionally, the sling spool is presently held in place on the drive shaft with a set screw which bears against the drive shaft. If the sling spool slips longitudinally on the drive shaft, vertical misalignment of the sling spool with the retriever assembly results. The misalignment causes both premature wear on the sling and the sling spool.

Frequently, slings become twisted below the retriever assembly and cause jamming at the retriever assembly when retrieving the slings onto the sling spools. The operator typically walks to the twisted sling to remove the twist. However, in order to get to the twisted sling the operator may walk beneath suspended lumber in adjacent bays. Failure of a sling in an adjacent bay would result in falling lumber inflicting serious bodily harm to the operator below.

Another problem associated with the sling sorter system described above is with the retrieval of the D-ring in the slot of the retriever assembly. Occasionally, the D-ring rotates relative to the length of the sling webbing at the point of attachment which results in the D-ring not being received in the slot of the retriever assembly upon retrieval. This additionally prevents the hook from catching the D-ring and forming the cradle for the next load of sorted lumber. The operator has to stop the operation until the D-ring is properly received in the retriever assembly.

The sling sorter system described above is more commonly used in the softwood industry as opposed to the hardwood or precious wood industry. The primary reason for this is the higher cost of hardwood or precious wood lumber and the damage that may result to the boards as they are sorted by the sling sorter system. Hardwood lumber is more prone to damage or breakage as the lumber is dropped from the upper rails to the underlying stack of lumber or cradles.

It is desirable to have a drop sling lumber sorter apparatus which increases the useful life expectancy of uneven end slings and minimizes the amount of down time required to maintain and repair the lumber sorter apparatus. It is also desirable to improve the safety of the operators during operation of the lumber sorter apparatus. It is also desirable to improve the lumber sorter apparatus to reduce the amount of damage to the lumber as it is being sorted and also to make the lumber sorter apparatus more suitable for use in the hardwood or precious wood industry.

SUMMARY OF THE PRESENT INVENTION

The drop sling lumber sorter of the present invention includes a frame assembly having a plurality of bays for receiving pieces of sorted lumber. Each of the bays includes a plurality of elongated, flexible, laterally spaced slings having a first end attached to a drive shaft and a second end with a ring capable of releasably attaching to a pivoting hook. The slings form cradles for the receipt of the sorted lumber. The drop sling lumber sorter includes a sling tensioner assembly to ensure that the slings are tensioned as they are reeled off or onto the drive shaft. The drop sling lumber sorter also includes a sling straightener assembly which removes any twists in the sling prior to it being wrapped onto the drive shaft.

The sling tensioner and straightener assemblies minimize downtime of the lumber sorter, extends the life of uneven end slings, and improves the safety of the entire apparatus.

The drop sling lumber sorter also includes a sling spool which can be installed or replaced on the drive shaft with a minimum of effort and downtime. The sling spool is assembled in semicircular segments on the drive shift. The sling spool includes tabs which lock the sling spool in place on the drive shaft and ensures that the sling remains secured to the drive shaft.

The ring at the second end of the sling includes an ear which maintains the ring in the plane of the sling webbing adjacent to the point of attachment. The ear ensures that the ring is properly aligned to be received by a slotted end of a retriever arm during the sling retrieval process.

The drop sling lumber sorter also includes a buffer to reduce the possibility of any damage to the sorted lumber as it falls onto the hook or the retriever arms. A handling assembly is further included in the drop sling lumber sorter to more gently handle the sorted lumber from the time it leaves the upper rails to the time it comes to rest on the hook or retriever arms or the sorted stack of lumber in the sling cradles.

BRIEF DESCRIPTION OF THE DRAWINGS

In order to more fully understand the drawings referred to in the detailed description of the present invention, a brief description of each drawing is presented, in which:

FIG. 1 is a partial top view of a lumber sorter according to the present invention;

FIG. 2 is a front elevational view of the lumber sorter shown in FIG. 1 showing a plurality of bays having flexible sling cradles for receipt of the sorted lumber;

DETAILED DESCRIPTION OF THE INVENTION

Figure 3:
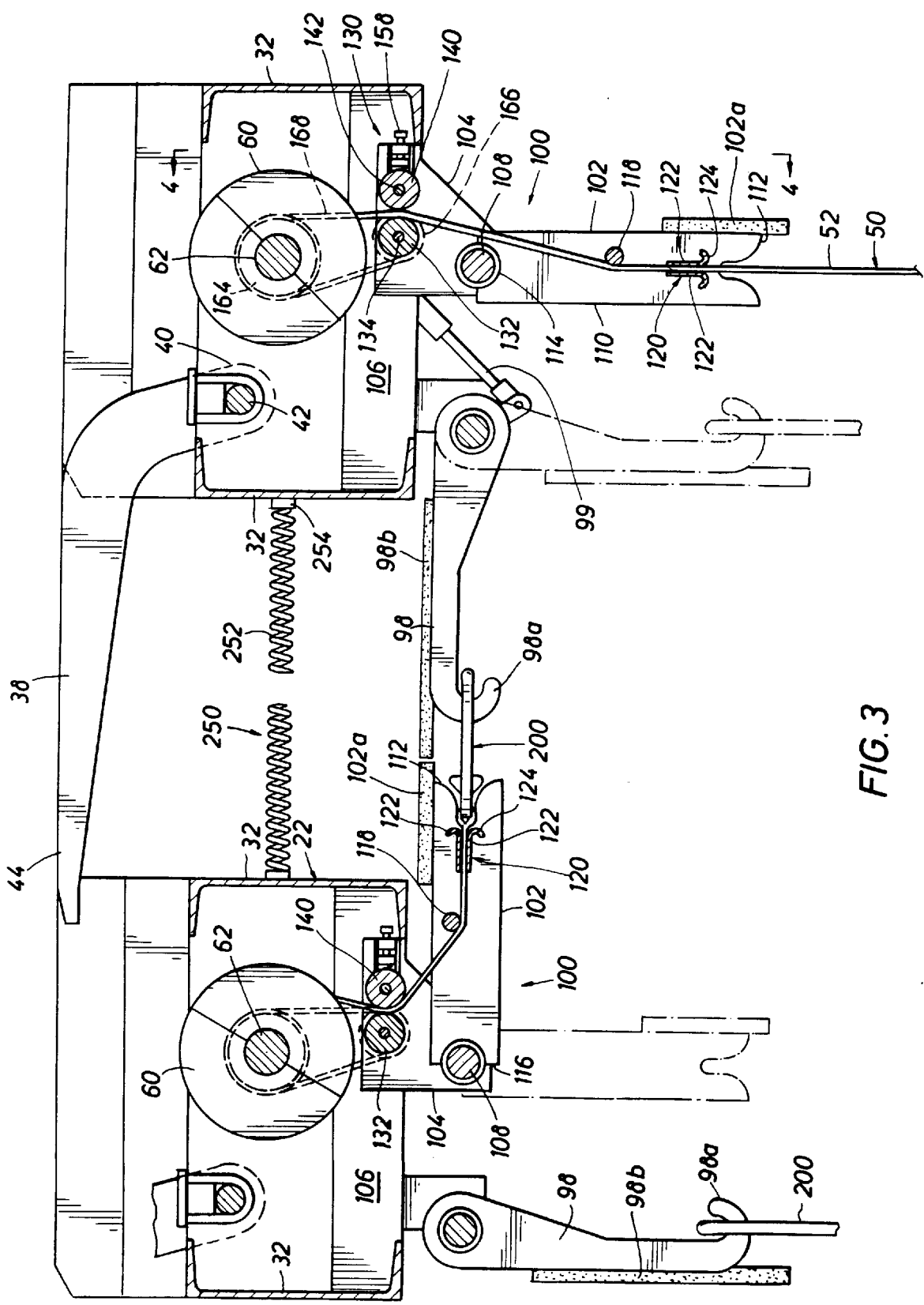
FIG. 3 is a sectional elevational view of the sling tensioner and retriever assembly according to the present invention.

Referring to FIGS. 1 and 2, the drop sling lumber sorter of the present invention, designated generally as 20, has a frame structure 22 defining a plurality of adjacent bays 24 for receiving pieces of lumber characterized by the letter L. For purposes of clarity, the bays 24 have been designated as 24a for the first bay, 24b for the second bay, etc. Each of the bays 24 can be designated to receive a predetermined size of lumber pieces L during the sorting operation. For example, the bay 24a can be designated to receive lumber pieces L having the physical characteristics of 2"×6"×8' (thickness (in.) by width (in.) by length (ft.)) boards, the bay 24b to receive 2"×8"×24' boards, the bay 24c to receive 2"×8"×16' boards, and the bay 24d to receive 2"×6"×16' boards. Although not shown in the drawings, it is known in the prior art to have an automated and programmable system incorporated into the lumber sorter 20 to detect the size of the lumber pieces L and selectively actuate a plurality of bay arms 38 to select and categorize the lumber pieces L within the predetermined bays 24. The drop sling lumber sorter 20 generally is of the type described in U.S. Pat. No. 3,776,379, issued Dec. 4, 1973, and U.S. Pat. No. 4,104,156, issued Aug. 1, 1978. These patents are herein incorporated by reference.

Referring to FIGS. 1 and 2, the frame structure 22 includes at least a pair of horizontally disposed main support members 30 and a plurality of horizontally disposed auxiliary support members 32 spanning between the main support members 30. A plurality of runners 34 span between pairs of auxiliary support members 32 and extend parallel to the main support members 30. The runners 34 are suitably spaced to slidably support the lumber pieces L as the lumber pieces L are slid along the upper surface of the frame structure 22. The runners 34 are not located directly above the bays 24 for reasons which will be explained below.

As shown in FIG. 1, the plurality of movable bay arms 38 are disposed superjacent each of the bays 24 and extend between pairs of auxiliary support members 32. The bay arms 38 are capable of pivoting between a closed position (FIG. 1) and an open position (FIG. 2). In the closed position as shown in FIG. 3, the upper surface of the bay arms 38 is substantially flush with the upper surface of the runners 34 which prevents the lumber pieces L from dropping into the bay 24 below and allows the lumber pieces L to pass on to a succeeding bay 24. In the open position as shown in FIG. 2, the bay arms 38 within the particular bay 24 are rotated about a pivot arm end 40 (FIG. 3) connected to a bay arm shaft 42. As the bay arm shaft 42 rotates an articulating extremity 44 of the bay arm 38 move upwardly and allows the approaching lumber piece L to drop into the bay 24 below. After the appropriate lumber piece or pieces L drop into the bay 24 the bay arm shaft 42 returns the bay arms 38 to the closed position.

In the preferred embodiment, the lumber sorter 20 includes a plurality of bay divider poles 25 pivotably suspended from the frame structure 22 as shown in FIG. 2. Preferably, three or more bay divider poles 25 are located along the length of the bay 24 to prevent a cradle of sorted lumber L from extending into an adjacent bay 24 and shifting the weight of its lumber L onto the slings 50 of the adjacent bay 24.

The lumber sorter 20 of the present invention includes means for systematically moving the lumber pieces L of various dimensions over the bays 24. Typically, the means for moving comprise a plurality of endless drag chain conveyors 26 and other ancillary structure (not shown). The lumbar L is fed in the direction of arrow 28, and is normally oriented to travel at an angle normal to its longitudinal axis. As shown in FIG. 2, the drag chain conveyors 26 are located above the upper surface of the frame structure 22 and include a plurality of lugs 36 which engage and forcibly slide the lumber pieces L along the runners 34 and the bay arms 38.

Figure 6:
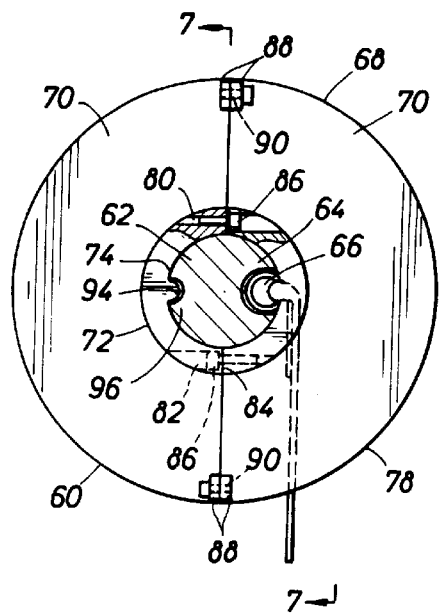
FIG. 6 is a side elevational view of the sling spool.
Figure 7:
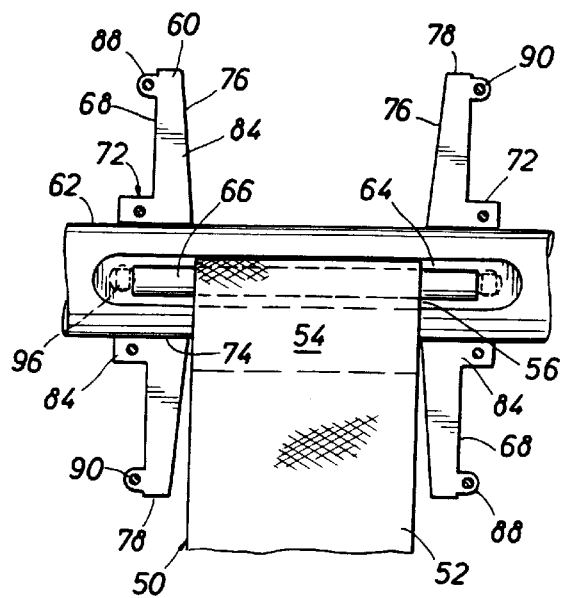
FIG. 7 is a view taken along line 7—7 of FIG. 6.

Referring to FIGS. 1–4, the lumber sorter 20 includes a plurality of elongated, flexible members or slings 50 in each of the bays 24. Typically, there are from three to five flexible slings 50 in each bay 24. FIG. 1 is shown with four flexible slings 50 in each bay 24. The slings 50 hang parallel to and below the bay arms 38. The slings 50 comprise a flexible webbing 52 having one end which is attached to an attachment eye, as for example a D-ring 200 (FIGS. 8 and 9), and a second end which is securely attached to a sling spool 60 mounted on a power-operated spool drive shaft 62 (FIGS. 6 and 7). Although not shown, the lumber sorter 20 includes a separate power means, such as an electric motor, for each bay 24 to wind and unwind the flexible slings 50 in unison about the respective sling spools 60 as is well known in the art. As shown in FIGS. 1 and 3, the spool drive shafts 62 are mounted to the frame structure 22 between and parallel to a pair of auxiliary support members 32.

The sling 50 is attached to the spool drive shaft 62 in the following manner with reference to FIGS. 6 and 7. The spool drive shaft 62 includes a longitudinal recess 64 therein. A spool end 54 of the webbing 52 has a loop 56 for receiving a cylindrical pin 66 therethrough as shown in FIGS. 6 and 7. The pin 66 has a length less than the length of the longitudinal recess 64 but greater than the width of the webbing 52. The diameter of the pin 66 is small enough such that the pin 66 and the loop 56 can be received in the recess 64. Typically, the webbing 52 has a width in the range of three to four and one-half inches.

The spool 60 is comprised of a pair of spool halves 68 with each spool half 68 comprising a pair of semicircular segments 70 (FIG. 6). In the preferred embodiment the semicircular segments 70 of the spool 60 are all identical. Each spool half 68 is split in half in order to facilitate the repair or replacement of a damaged spool 60 without the necessity of removing the drive shaft and the associated drive mechanism. Each spool half 68 includes a central hub portion 72 having a bore 74 therethrough. The bore 74 is sized to receive the drive shaft 62. The spool half 68 has an inner face 76 which angles outwardly from the bore 74 to the outer periphery 78 of the spool half 68 to thus form a substantially flat conical surface as shown in FIG. 7. The semicircular segments 70 are secured to one another by a plurality of bolts. As shown in FIG. 6, each hub portion 72 includes a first threaded bore 80 and a second bore 82 having a first portion of larger diameter than a second portion. Preferably, the first and second bores 80 and 82 are transverse to and intersect the mating faces 84 of the hub portion 72 such that when two segments 70 are joined together the first bore 80 of one segment 70 aligns with the second bore 82 of the second segment 70 and the second bore 82 of the first segment 70 aligns with the first bore 80 of the second segment 70. A pair of bolts 86 are inserted into the second bores 82 and threadedly engaged with the first bores 80 to secure the hub together. The segments 70 include a pair of mating lugs 88 at the outer ends of the mating faces 84 of the segments 70. The lugs 88 have a bore 90 therethrough to receive a fastening means 92, such as a threaded bolt and nut. Thus, the segments 70 are held together at the mating face 84 of the hub portion 72 and at the outer periphery 78. This ensures that no sharp edges at the mating face 84 of the segments 70 comes into contact with the webbing 52 as it winds and unwinds from the sling spool 60.

Figure 8:
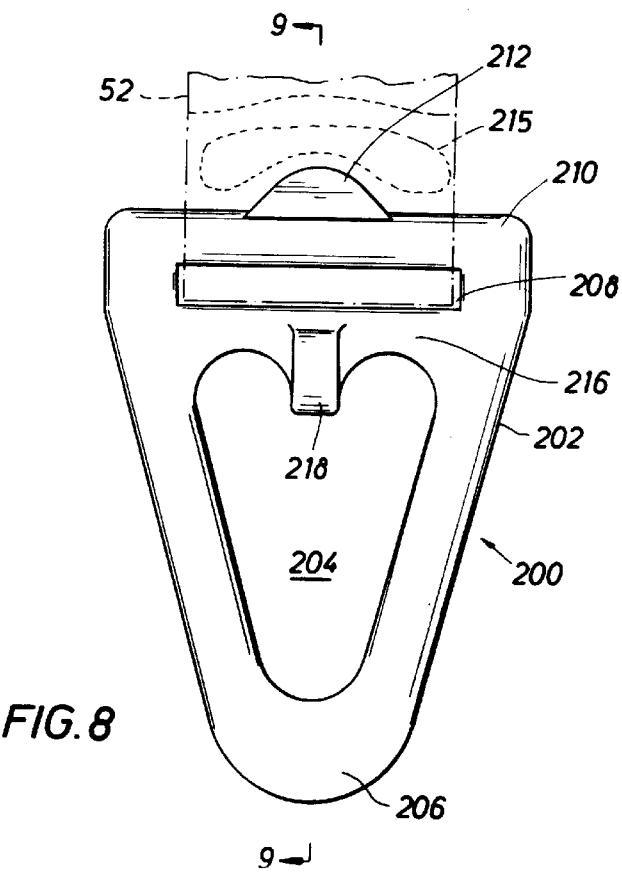
FIG. 8 is a front elevational view of a D-ring.
Figure 9:
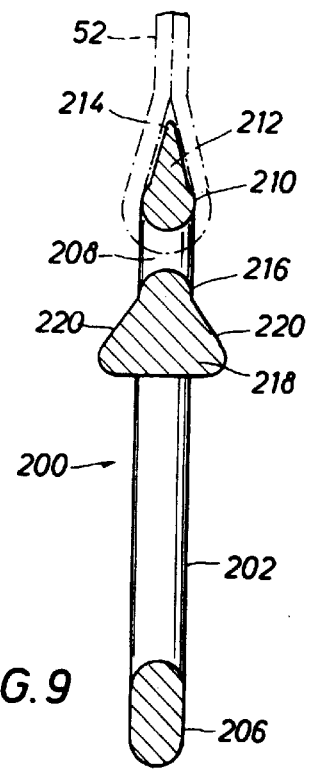
FIG. 9 is a sectional view taken along line 9—9 of FIG. 8.

Still referring to FIGS. 6 and 7, the interior of each hub portion 72 of each segment 70 includes a locking tab 94 which is capable of being received in a corresponding tab recess 96 in the drive shaft 62. The tab recess 96 is diametrically located relative to the longitudinal recess 64. Receipt of the locking tab 94 in the tab recess 96 locks the longitudinal location of the spool half 68 on the drive shaft 62. The locking tab 94 on the opposing hub portion 72 is received within the longitudinal recess 64 and ensures that the cylindrical pin 66 is maintained within the hub portions 72 of the pair of spool halves 68 which secure the sling 50 to the drive shaft 62. Referring to FIGS. 3, 8 and 9, the other end of the sling 50 has an attachment eye referred to as a D-ring 200. The D-ring 200 comprises a substantially planar member 202 that is approximately triangular in shape (FIG. 8). Preferably, the D-ring 200 is made of metal or other high strength material. Referring to FIG. 8, the D-ring 200 has an opening 204 formed near an apex 206. The opening 204 is capable of receiving a pivotable hook 98 of the lumber sorter 20 as shown in FIG. 3. Because the hook 98 is generally large and its movement imprecise, the opening 204 must be large enough to receive the hook 98 without a great deal of precise alignment. On the other hand, the opening 204 cannot be so large that the metal is too thin to support a heavy load of lumber L as shown in the bay 24c in FIG. 2.

Referring to FIGS. 8 and 9, the planar member 202 preferably includes an elongated slot 208 formed between the opening 204 and a base portion 210 of the planar member 202. An anchor or ear 212 extends from a central area of the base portion 210 in a direction opposite the elongated slot 208. Preferably, the ear 212 has a thickness less than or approximately equal to the thickness of the base portion 210 and tapers to a lesser thickness at its end 214 opposite the base portion 210. It is to be understood that the ear 212 is located opposite the elongated slot 208 and may have a length approximating or even exceeding the length of the slot 208. Preferably, the height of the ear 212 is in the range of approximately one-half to one inch. It is to be further understood that the ear 212 could also be another shape as opposed to the rounded shape shown in FIG. 8, as for example a rectangular shape.

The sling webbing 52, as shown in dashed lines in FIGS. 8 and 9, is threaded through the elongated slot 208 and then folded back over the base portion 210 and the ear 212 to form a loop. As shown in FIG. 8, after forming the loop the double thickness of the webbing 52 is then secured together, as for example by sewing and fastening with stitches 215, to permanently attach the webbing 52 to the D-ring 200. In addition to securing the double thickness of webbing 52 together, the stitches 215 are sewn in close proximity to the outermost periphery of the ear 212 and the base portion 210 as shown in FIG. 8 to prevent the ear 212 and the base portion 210 from rotating within the formed webbing loop. This results in the plane of the planar member 202 being substantially maintained in the plane of the stitched, double thickness of webbing 52.

Preferably, the edges of the planar member 202 around the slot 208 are rounded or beveled to avoid cutting the webbing 52. In the preferred embodiment, all of the edges of the D-ring 200 are rounded to eliminate any sharp or cutting edge surfaces of the D-ring 200. The long axis of the slot 208 is parallel to the base portion 210. Further protection of the webbing 52 may be provided by providing a sleeve (not shown) of abrasion resistant material, such as cordura, over that portion of the webbing 52 in most direct contact with the planar member 202.

Preferably, the elongated slot 208 has a length slightly greater than the width of the webbing 52 and a slot height only slightly greater than the thickness of the webbing 52. The size of the slot 208 is important in preventing the formation of steel burrs around the perimeter of the slot 208 where the webbing 52 is in contact therewith. The preferred size of the slot 208 minimizes the movement of the webbing 52 relative to the slot 208 which in turn greatly reduces the possibility of the webbing 52 being cut or damaged by burrs. Additionally, the preferred height of the slot 208 prevents movement of the webbing 52 relative to the longitudinal axis of the D-ring 200. This is very important in extending the life of the sling 50 due to the fact that the webbing 52 does stretch after repeated use and the loop will also stretch. However, since the height of the slot 208 is the approximate thickness of the webbing 52, the webbing 52 is securely held in the slot 208 and movement of the webbing 52 relative to the D-ring 200 is minimized. The anchor or ear 212 further aids in preventing any rotation of the webbing loop after slight stretching of the webbing loop has occurred.

Referring to FIG. 8, the opening 204 and the elongated slot 208 are separated by an intermediate portion 216 of the planar member 202. A wear pad 218 having ramped sides 220 is attached to the intermediate portion 216 opposite the elongated slot 208 and extends transversely from the plane of the planar member 202. If the D-ring 200 is molded the wear pad 218 and the ear 212 can be integrally formed therewith. If the D-ring 200 is not molded these components will be welded to the planar member 202. The wear pad 218 extends transversely from the planar member 202 a distance which is greater than the thickness of the webbing 52 that is looped through the elongated slot 208, thus providing protection for the webbing 52. Preferably, the wear pad 218 extends approximately one-half inch beyond the faces of the planar member 202. The wear pad 218 provides a landing surface so that whenever the D-ring 200 lands flat beneath a pile of sorted lumber L, the wear pad 218 prevents the webbing 52 from being crushed or damaged between the planar member 202 and the lumber L. Additionally, the wear pad 218 raises the base portion 210 off of the floor surface so that the webbing 52 is not in contact with the floor surface as the D-ring 200 is dragged beneath a pile of sorted lumber L.

The ramped sides 220 of the wear pad 218 ramp inwardly towards the intermediate portion 216 as shown in FIG. 9. The ramped sides 220 prevent the wear pad 218 from catching the lumber or other metal structures as the D-ring 200 is dragged beneath a pile of lumber L. The wear pad 218 is also fairly small relative to the lumber L to prevent damage to the lumber L as the D-ring 200 is dragged beneath or through a pile of lumber L.

Figure 4:
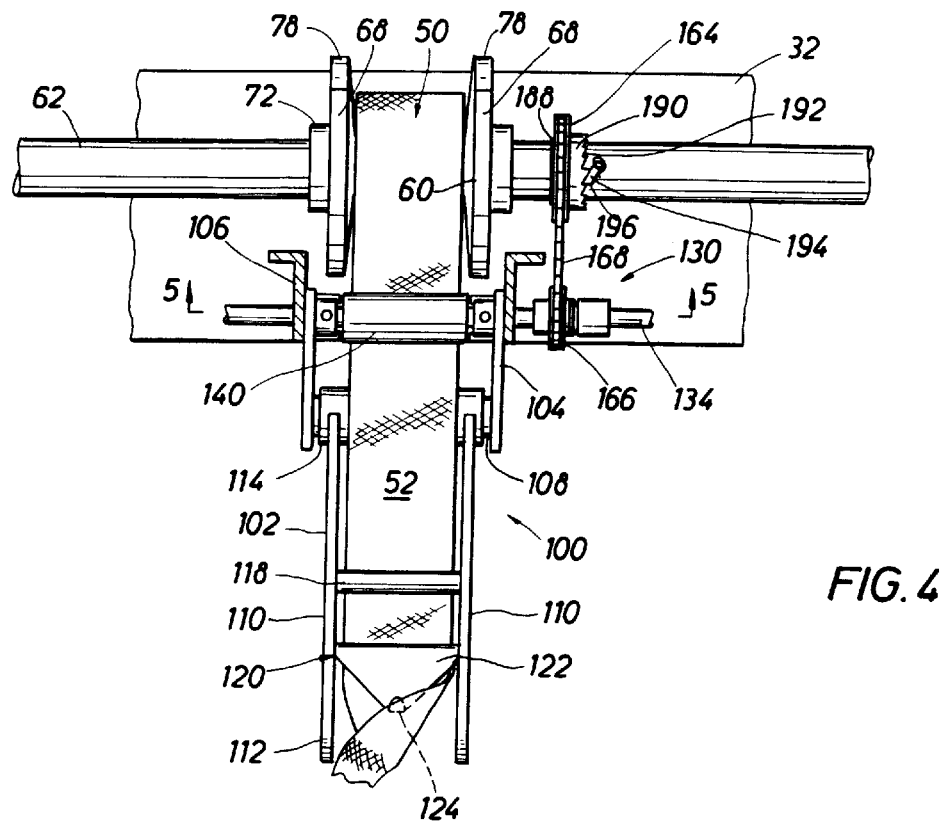
FIG. 4 is a view taken along line 4—4 of FIG. 3 showing the sling tensioner assembly.

Referring to FIGS. 3 and 4, a sling retriever assembly, designated generally as 100, is swingably attached to the frame structure 22 for movement between a normal depending position as shown on the right hand side of FIG. 3 and a substantially horizontal position as shown in solid lines on the left hand side of FIG. 3. The sling retriever assembly 100 includes a retriever arm 102 rotatably connected to a retriever shaft or pipe 108. The retriever shaft 108 is supported by a pair of brackets 104 which are mounted to a pair of framing brackets 106. The framing brackets 106 are connected to a pair of auxiliary support members 32. Preferably, the retriever shaft 108 is substantially vertically below the drive shaft 62 of the sling spools 60. The retriever arm 102 includes a pair of opposing arm plates 110 which are separated a distance slightly greater than the width of the sling webbing 52 as shown in FIG. 4. The retriever arm 102 has a contour slotted free end 112 adapted to receive the base portion 210 of the D-ring 200 therein during the sling 50 retrieval operation which will be explained below. The slotted free end 112 is further capable of maintaining the D-ring 200 in a substantially horizontal position when the retriever arm is in the horizontal position as shown in FIG. 3.

Opposite the slotted free end 112 of the arm plate 110 is an arm sleeve 114 connected to a second end 116 of the arm plate 110. The arm sleeve 114 rotatably fits onto the retriever shaft 108. A pivot actuating rod 118 is positioned between the pair of arm plates 110 and approximately intermediate the slotted free end 112 and the second end 116. As shown in FIG. 3, the actuating rod 118 is preferably positioned so that it is substantially tangential with a longitudinal center line of the retriever arm 102. Additionally, the actuating rod 118 is located off the retriever arm 102 center line in the direction of rotation of the retriever arm 102 to the horizontal position.

Referring to FIG. 3, a first buffer 98b is preferably mounted to the upper surface of the hook 98 and a second buffer 102a is mounted to the upper surface of the retriever arm 102. Preferably, the buffers 98b and 102a are made from a shock absorbing, durable material such as a rubber. The first and second buffers 98b and 102a, respectively, serve to reduce the possibility of any damage to the sorted lumber as it falls onto the hook 98 or the retriever arm 102 as will be explained below. Preferably, the buffers 98b and 102a leave only a small gap between themselves when in the substantially horizontal position as shown in the center of FIG. 3. This ensures that falling sorted lumber L will not come into contact with any hard or sharp surfaces which could damage or break the lumber L.

Referring to FIGS. 3 and 4, a sling straightener assembly 120 is positioned between the arm plates 110 on the longitudinal center line of the retriever arm 102. The sling straightener assembly 120 is further positioned between the actuating rod 118 and the slotted free end 112 of the retriever arm 102. The sling straightener assembly 120 includes a pair of generally triangular-shaped plates 122 having a rolled apex 124 in the direction of the slotted free end 112. The apex 124 is rolled to eliminate any pointed or blunt surfaces which could damage the webbing 52 and also to provide a large webbing contact area for removing any twist in the webbing 52. The spacing between the triangular-shaped plates 122 is sufficient to allow approximately a double thickness of the sling webbing 52 to pass through.

Figure 5:
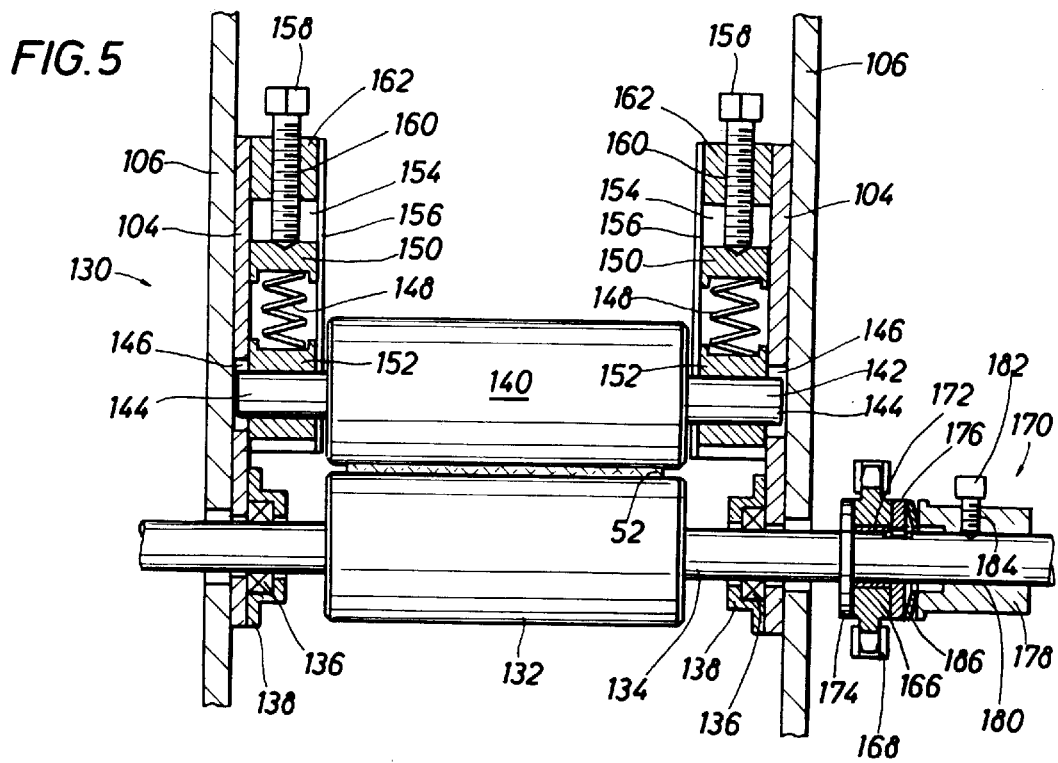
FIG. 5 is a view taken along line 5—5 of FIG. 4.

Referring to FIGS. 3, 4 and 5, a sling tensioner assembly 130 will be described in detail. The sling tensioner assembly 130 includes a drive roller 132 rotatably driven by a roller drive shaft 134. Preferably, the roller drive shaft 134 extends along the length of the lumber bay 24. The drive roller 132 is mounted on the roller drive shaft 134 at a location below the sling spool 60. The roller drive shaft 134 is supported by the pair of brackets 104 which are mounted to the pair of framing brackets 106 as shown in FIGS. 4 and 5. Preferably, the roller drive shaft 134 is mounted with a bearing 136 housed in a bearing race 138. The bearing race 138 is attached to the bracket 104.

A tension roller 140 is mounted on a tension roller shaft 142. The tensioner roller shaft 142 is parallel to the roller drive shaft 134. The tension roller shaft 142 has a pair ends 144. Each end 144 is received in an elongated slot 146 in the bracket 104 as shown in FIG. 5. The elongated slot 146 is oriented so as to allow the tension roller shaft 142 to translate towards and away from the roller drive shaft 134. Each end 144 of the tension roller shaft 142 is spring loaded to force the tension roller 140 towards the drive roller 132 as shown in FIG. 5. A pair of springs 148 are positioned between first and second tension housings 150 and 152, respectively. The first and second tension housings 150 and 152 are permitted to slide along the surface of the bracket 104. A pair of side housing plates 154 are attached to the bracket 104 along one edge and have a flanged second end 156 to maintain the alignment of the first and second tension housings 150 and 152.

An adjustment screw 158 threadably engages a threaded bore 160 of a tension plate 162. The adjustment screw 158 extends through the tension plate 162 and contacts the first tension housing 150 as shown in FIG. 5. The amount of force applied to the second tension housing 152 is adjusted by the adjustment screw 158. It is to be understood that other means may be used to spring load the tension roller 140 in the direction of the drive roller 132.

In the preferred embodiment, the sling tensioner assembly 130 includes a drive sprocket 164 mounted on the drive shaft 62 as shown in FIG. 4. A follower sprocket 166 is mounted to the roller drive shaft 134. The drive and follower sprockets 164 and 166, respectively, are connected by an endless chain 168. Thus, as the drive shaft 162 rotates in the direction to unwind the sling 50, the roller drive shaft 134 is also rotated by the sprockets 164, 166 and endless chain 168. The rotation of the roller drive shaft 134 rotates the drive roller 132 and feeds the sling 50 between the rollers 132 and 140.

Preferably, the ratio of the sprockets 164 and 166 is such that tension is always applied to the sling 50 by the sling tensioner assembly 130 during the unwinding of the sling So from the drive shaft 62. The rate at which the sling 50 comes off the drive shaft 62 per revolution of the drive shaft 62 is dependent upon the number of wraps of sling 50 remaining on the drive shaft 62. For example, typically a 50 foot long sling 50 is used with the drop sling lumber sorter 20. The drive shaft 62 has a diameter of 2½". There are approximately 28 wraps of the sling 50 on the drive shaft 62 when the sling 50 is fully wrapped onto the drive shaft 62. The 28 wraps on the drive shaft 62 results in the outer wrap having a diameter of approximately 10". Thus, one revolution of the drive shaft 62 results in approximately 31" of sling 50 coming off of the drive shaft 62. If the drive roller 132 has a diameter of 2", each revolution of the roller drive shaft 134 results in 6" of sling length being fed between the rollers 132 and 140. Thus, the sprocket ratio in this example preferably should be on the order of 5:1. As the number of wraps of sling 50 on the drive shaft 62 deceases, the drive roller 132 will have a tendency to be rotating faster than the sling 50 is coming off of the drive shaft 62. Thus, it may be desirable to include a slip clutch 170 in the sling tensioner assembly 130. Referring to FIG. 5, the follower sprocket 166 includes an inner bushing 172 which allows the follower sprocket to rotate relative to the roller drive shaft 134. A retainer ring 174 is secured to the roller drive shaft 134 and is in contacting engagement with the follower sprocket 166. A friction pad 176 is in contacting engagement with the follower sprocket 166 and opposite the retainer ring 174. A clutch housing 178 has a bore 180 extending therethrough for receiving the roller drive shaft 134. A set screw 182 is received in a threaded bore 184 of the clutch housing 178. A spring means 186 is positioned between the friction pad 176 and the clutch housing 178. As shown in FIG. 5, the spring means 186 may be a belleville-type washer. The set screw 182 is tightened against the roller drive shaft 134 when the appropriate amount of spring force is acting against the friction pad 176 as will be explained in further detail below.

The slip clutch 170 allows the follower sprocket 166 to rotate relative to the roller drive shaft 134 when the rate at which the sling 50 is coming off the drive shaft 62 is less than the rate of the drive roller 132 if the follower sprocket 166 was not permitted to rotate relative to the roller drive shaft 134. Thus, as the power drive shaft 62 rotates to unwrap the sling 50, the sling tensioner assembly 130 constantly applies a tension force to the sling 50 coming off of the spool 60.

The sling tensioner assembly 130 also includes an assembly for maintaining tension in the sling 50 as it is being wound onto the spool 60. Referring to FIG. 4, preferably the drive sprocket 164 is mounted on the drive shaft 62 such that the drive shaft 62 is allowed to rotate relative to the drive sprocket 164 in one direction. A retainer ring 188 is firmly attached to the drive shaft 62. Although not shown, the drive sprocket 164 includes an inner bushing which is allowed to rotate on the drive shaft 62. The drive sprocket 164 includes a hub 190 having a plurality of end teeth 192 circumferentially spaced around the hub 190. One or more gripper pins 194 are pin connected to the drive shaft 62. The gripper pins 194 include a tooth portion 196 capable of engaging the teeth 192 of the hub 190. The gripper pin 194 is spring biased such that the tooth portion 196 is urged towards engagement with the end teeth 192. The configuration of the teeth 192 and the tooth portion 196 and the spring biased gripper pin 194 allows the power drive shaft 62 to rotate relative to the drive sprocket 164 when the drive shaft 62 is rotated in a clockwise direction when looking from the right-hand side of FIG. 4. However, rotation of the drive shaft 62 in a counterclockwise direction engages the gripper pin 194 with a tooth 192 of the hub 190 to cause the drive sprocket 164 to rotate with the drive shaft 62.

Referring to FIG. 3, an optional handling assembly 250 may also be included in the drop sling lumber sorter 20 to more gently handle the sorted lumber L from the time it leaves the rails on the upper surface of the lumber sorter 20 to the time it comes to rest on the hook 98, the retriever arms 102, or the sorted stack of lumber L in the sling cradles. As shown in FIG. 3, the handling assembly 250 comprises a plurality of handling means 252 mounted to the pair of opposing auxiliary support members 32. Preferably, the handling means 252 are comprised of a plurality of cylindrical or conical helical springs which are uniformly spaced along the length of the auxiliary support member 32. The springs 252 are preferably rubber-coated to prevent damaging the lumber L. The springs 252 are mounted to an elongated bar 254 which is attached to the auxiliary support member 32. Although only one tier of springs 252 is shown in FIG. 3, one or more tiers of springs 252 may be utilized to gently handle the falling lumber L. Preferably, the spacing between each spring 252 on the bar 254 is 2' or less. The springs 252 in opposing relationship as shown in FIG. 3 may be directly opposing or may be staggered or offset from one another. The primary purpose of the handling means 252 is to eliminate any damage to the lumber L resulting from the "free fall" of the lumber L from the upper surface of the lumber sorter apparatus 20 to its landing place on the hook 98, the retriever arms 102, or the sorted stack of lumber L in the sling cradles. The falling lumber L will contact the springs 252 which will slow down and break the free fall of the lumber L. Although not shown, it is to be understood that the handling assembly 250 could alternatively be comprised of a plurality of ramped surfaces, or one or more doors which would open upon receiving a board L. These alternative handling assemblies 250 would also serve to slow down and break the free fall of the lumber L.

ASSEMBLY AND OPERATION OF THE PRESENT INVENTION

The assembly and operation of the preferred embodiment will now be described beginning with the installation of the sling 50. One end of the sling 50 is permanently fastened to the D-ring 200 as shown in FIGS. 8 and 9. The end of the webbing 52 is looped through the elongated slot 208 of the D-ring 200 and then folded back over the base portion 210 and the ear 212 to form a loop. As shown in FIG. 8, after forming the loop the double thickness of the webbing 52 is then secured together, as for example by sewing and fastening with stitches 215, to permanently attach the webbing 52 to the D-ring 200.

The spool end 54 of the webbing 52 is securely attached to the spool drive shaft 62 in the following manner with reference to FIGS. 3, 4, 6 and 7. Referring to FIGS. 3 and 4, the webbing loop 56 without the pin 66 is inserted through the sling straightener assembly 120 from the slotted free end 112 of the retriever arm 102. The webbing 52 is pulled along the longitudinal center line of the retriever arm 102 and to the side of the actuating rod 118. The webbing loop 56 is then forced between the rollers 132 and 140. The spring loaded tension roller 140 permits the double thickness of the webbing loop 56 to pass through. The loop 56 is pulled up to the longitudinal recess 64 in the spool drive shaft 62. The pin 66 is inserted into the loop 56 so that each of its ends extend beyond the edge of the webbing 52. The pin 66 and the loop 56 are inserted in the recess 64 as shown in FIG. 7. A pair of semicircular segments 70 are secured together over one end of the pin 66 with a plurality of bolts to form a spool half 68. Referring to FIGS. 6 and 7, one of the locking tabs 94 in the hub of the spool half 68 is received in the tab recess 96 in the drive shaft 62 with the opposing locking tab 94 received within the longitudinal recess 64 at a location beyond the end of the pin 66 (FIG. 7). The second spool half 68 is similarly installed. The locking tabs 94 guarantee both that the cylindrical pin 66 is maintained within the hub portions 72 of the pair of spool halves 68 and that the spool halves 68 remain locked in place on the spool drive shaft 62. Furthermore, it is to be appreciated that a damaged spool 60 or spool half 68 can easily be replaced and without the necessity of removing the spool drive shaft 62.

Referring to FIG. 4, with the slings 50 attached to the drive shaft 62 as described above, the drive shaft 62 is powered to rotate in a clockwise direction when viewing from the right-hand side of FIG. 4. The rotating drive shaft 62 simultaneously winds the slings 50 within the bay 24 onto the drive shaft 62. The drive shaft 62 rotates relative to the drive sprocket 164. The spring loaded tension roller 140 applies firm pressure to the webbing 52 between the tension roller 140 and the drive roller 132. As the webbing 52 is pulled between the rollers 132 and 140, the webbing 52 is tensioned slightly as it winds onto the drive shaft 62. The compression force acting against the webbing 52 and the drive roller 132 by the spring loaded tension roller 140 may cause the drive roller 132 and the roller drive shaft 134 to rotate in a direction opposite that of the spool drive shaft 62 during this step of retrieving the sling 50 onto the drive shaft 62. If desired, added sling tension could be derived by preventing the drive roller 132 and the roller drive shaft 134 from rotating during the retrieval step.

The tension applied to the sling 50 by the rollers 132 and 140 assists in maintaining the sling 50 in alignment with the sling spool 60 and further helps to remove any slack in the sling 50 as it winds onto the drive shaft 62. This eliminates the possibility of the sling 50 "jumping off" of the spool as it is retrieved on the drive shaft 62.

As the sling 50 is being retrieved onto the drive shaft 62, any twists in the sling 50 are eliminated by the sling straightener assembly 120 as shown in FIG. 4. As mentioned above, the spacing between the triangular-shaped plates 122 of the sling straightener assembly 120 is sufficient to allow a single thickness of the sling webbing 52 to freely pass through. The rolled apex 124 slips beneath the twist in the sling 50 and removes the twist as the sling 50 passes through the sling straightener assembly. The removal of the twists from the sling 50 helps to maintain the alignment of the sling 50 with the rollers 132 and 140 and the sling spool 60.

During the sling retrieval operation, the retriever arm 102 freely hangs in a substantially vertical position as shown in FIG. 4 and on the right hand side of FIG. 3. The drive shaft 62 retrieves the sling webbing 52 through the retriever assembly 100 until the D-ring 200 is firmly seated in the slotted free end 112 of the retriever arm 102. The continued rotation of the drive shaft 62 causes the retriever arm 102 to swivel upwardly approximately 90 degrees so that it extends horizontally across the bay opening of the lumber sorter 20 as shown on the left hand side of FIG. 3. Rotation of the drive shaft 62 is stopped at this point.

A hook cylinder 99 is activated to downwardly insert the hook end 98a of the pivotable hook 98 through the opening 204 of the D-ring 200. By engaging the D-ring 200 with the pivotable hook 98, the bay 24 is now ready to receive sorted lumber L. The first sorted boards L fall gently onto the second buffer 102a of the retriever arm 102 and/or the first buffer 98b of the pivotable hook 98. The handling assembly 250, if installed, allows the lumber L to pass through but breaks the free fall of the lumber L prior to the lumber L coming to rest on the buffers 98b, 102a. As the sorted lumber L falls into the bay 24, the pivotable hook 98 is rotated in a slight downwardly direction and the power-operated drive shaft 62 rotates the sling spool 60 to pay out a sufficient length of sling 50 to permit the retriever assembly 100 to rotate to a substantially vertical hanging position as the sling cradles fill with the sorted lumber L. The pivotable hook 98 is also rotated to a substantially vertical position as the sling cradles fill with lumber L. As the drive shaft 62 rotates to unwind the sling 50, the sling tensioner assembly 130 is engaged to pull the sling 50 through the rollers 132 and 140.

It is important to understand that the connection of the hook 98 with the D-ring 200 must be automated and dependable. It is critical to the smooth, dependable operation of the lumber sorter 20 that the D-ring 200 remain in substantial planar alignment with stitched end of the webbing 52. The addition of the ear 212 to the base portion 210 of the D-ring 200 and the stitching proximate the outer periphery of the ear 212 prevents the D-ring 200 from rotating within the formed webbing loop. The result is that the D-ring 200 is substantially maintained in the plane of the stitched, double thickness of webbing 52 and is always aligned for automatic receipt in the slotted free end 112 of the retriever arm 102.

The bay 24 is ready to receive sorted lumber L when the D-ring 200 is engaged with the hook 98 in their substantially horizontal positions as shown in FIG. 3. The sling cradles form as the first boards L are gently dropped onto the retriever arms 102 and/or hooks 98 and as the hooks 98 rotate and the slings 50 pay out.

As shown in FIG. 2, the sling cradles deepen as the sorted lumber L continues to fill the cradles. The purpose of this is to minimize the distance which the sorted lumber L falls so as to minimize damaging the lumber L during the fall.

It is important to understand that all of the slings 50 within a given bay 24 are simultaneously driven by a single drive shaft 62. Thus, all of the slings 50 within a bay 24 are fed off of the drive shaft 62 at the same time. However, not all of the slings 50 within the bay 24 are loaded as the lumber L is sorted and received within the bay 24. For example, the bay 24a as shown in FIG. 1 may be designated to receive 2"×4"×8' boards. It is to be understood that during the sorting process, all of the boards L of various lengths have one aligned end L' referred to as the "even end" and a second end L" referred to as the "uneven end" as shown in FIG. 1. As the 2"×4"×8' boards are deposited in the sling cradles of bay 24a, only two of the four slings 50 are actually supporting the sorted lumber L. To facilitate the following description, the plurality of slings 50 in the bay 24a are referenced as 50a, 50b, 50c, and 50d with sling 50a being nearest the even end L' of the boards L and 50d being the farthest from the even end L'.

The sling tensioner assembly 130 provides a significant improvement over the prior art drop sling lumber sorters. The sling tensioner assembly 130 ensures that slings 50c and 50d are pulled off of the spool 60 and drive shaft 62 even though these slings 50c and 50d support no weight of the sorted lumber L in the above example as shown in FIG. 1. This eliminates many problem associated with these slings 50c, 50d becoming twisted, becoming slack on the sling spool 60, slipping off of the sling spool 60 and wrapping around the drive shaft 62 outside of the sling spool 60, or becoming slack on the sling spool 60 and then doubling up on itself. Oftentimes, the uneven end slings (50c and 50d in the example) on prior art lumber sorters have a life expectancy of approximately only ⅓ that of even end slings (50a and 50b in the example). Occasionally, the uneven end slings may last only 15% of the life of the even end slings. The sling tensioner assembly 130 of the present invention will increase the life expectancy of the uneven end slings to at least that of the even end slings. Thus, maintenance and inspection of uneven end slings is reduced to that of the even end slings. The overall effect is that the improved lumber sorter 20 is more efficient, dependable and safer to use than in the past.

When the load carrying sling cradles are full and ready to be unloaded, the slings 50 are typically allowed to pay out until the load of lumber L is supported on a support surface S (FIG. 2). The hook 98 is withdrawn from the opening 204 of the D-ring 200, thereby detaching the D-ring 200 and allowing the D-ring 200 and the attached end of the sling webbing 52 to fall to the ground. The wear pad 218 protects the webbing 52 looped through the elongated slot 208 from damage as the D-ring 200 hits the ground by maintaining the webbing 52 off of the ground. The webbing 52 is then reeled in by the drive shaft 62. The wear pad 218 also minimizes damage to the webbing 52 as the sling 50 is being reeled in and dragged beneath the pile of sorter lumber L by maintaining a clearance both above and below the D-ring plate 202 and the attached webbing 52, thus reducing the adverse effects of the webbing 52 being dragged between the ground and the rough lumber L. After the D-ring 200 is free of the sorted lumber L, the drive shaft 62 reels the sling 50 onto the drive shaft 62 until the D-ring 200 is received in the slotted free end 112 of the retriever arm 102 and the retriever arm 102 has returned to the substantially horizontal position.

The foregoing disclosure and description of the invention is illustrative and explanatory thereof, and various changes in the size, shape, and materials, as well as in the details of illustrative construction and assembly, may be made without departing from the spirit of the invention.

I claim:

1. A drop sling lumber sorter apparatus comprising:
   a frame assembly including a plurality of bays for receiving pieces of sorted lumber;
   each of said bays comprising:
      a spool drive shaft rotatably mounted to said frame assembly, said spool drive shaft having a radius and a plurality of recesses therein;

a plurality of flexible, laterally spaced slings having a first end and a second end;

means for mounting said first end of each of said slings to said spool drive shaft;

a spool assembly mounted on said spool drive shaft for each of said slings, each said spool assembly capable of guiding said sling onto said spool drive shaft, each said spool assembly comprising a pair of spool halves with each said spool half comprising a pair of semicircular segments, each said spool half installed on said spool drive shaft by joining a said pair of semicircular segments around said spool drive shaft, and each said semicircular segment having a hub portion with an inner radius substantially the same as the radius of said spool drive shaft, said hub portion including an extending locking tab received in a said recess in said spool drive shaft to secure the longitudinal location of said spool half on said spool drive shaft;

wherein said slings are reeled onto or reeled off of said spool drive shaft as said spool drive shaft rotates.

2. The apparatus of claim 1, wherein said semicircular segments are identical.

3. The apparatus of claim 1, wherein said means for mounting said first end of each of said slings to said spool drive shaft comprises:

a longitudinal recess in said spool drive shaft, said longitudinal recess having a length defined by first and second recess end walls;

said sling having a width and a loop formed at said first end;

a pin extending through said loop and received in said longitudinal recess, said pin having first and second ends; and said first and second spool portions secured to said spool drive shaft and retaining said pin within said longitudinal recess.

4. The apparatus of claim 3, wherein said pin has a length greater than said sling width and smaller than said longitudinal recess length.

5. The apparatus of claim 4, wherein each said hub portion includes said extending locking tab such that when said pair of semicircular segments are joined to form one said spool half, said spool half includes first and second locking tabs, wherein said first locking tab is received in a spool locator recess in said spool drive shaft and said second locking tab is received in said longitudinal recess adjacent an end of said pin.

6. The apparatus of claim 5, wherein said second locking tab is received in said longitudinal recess between a said recess end wall and an end of said pin.

7. A drop sling lumber sorter apparatus comprising:

a frame assembly including a plurality of bays for receiving pieces of sorted lumber, each said bay comprising:

a spool drive shaft rotatably mounted to said frame assembly, said spool drive shaft having a plurality of spool locators;

a plurality of flexible, laterally spaced slings having a first end mounted to said spool drive shaft and a second end; and a spool assembly mounted on said spool drive shaft for each of said slings, each said spool assembly capable of guiding said sling onto said spool drive shaft, said spool assembly comprising first and second spool portions, said spool portions joined together around said spool drive shaft, at least one of said spool portions having a locking member engaging said spool locator of said spool drive shaft to secure the longitudinal location of said spool assembly on said spool drive shaft, and said first and second spool portions can only be joined around said spool drive shaft with said locking member engaging said spool locator.

8. The apparatus of claim 7, wherein said spool locator comprises a tab recess and said locking member comprises a locking tab, wherein said locking tab is received in said tab recess.

9. The apparatus of claim 8, wherein said locking tab must be received in said tab recess for said first and second spool portions to be joined together around said spool drive shaft.

10. The apparatus of claim 7, wherein said first spool portion has a first hub portion and said second spool portion has a second hub portion, said first and second hub portions forming a circular hub with said spool portions joined together, said circular hub fitting around said spool drive shaft.

11. The apparatus of claim 10, wherein said first and second spool portions are semicircular.

* * * * *